(12) United States Patent
Grimm et al.

(10) Patent No.: US 6,712,862 B1
(45) Date of Patent: Mar. 30, 2004

(54) GRANULAR COMPACTS, THEIR PRODUCTION AND USE

(75) Inventors: Roland Grimm, Bubendorf (CH); Claude Haldimann, Birsfelden (CH); Werner Schumann, Efringen-Kirchen (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/463,164

(22) PCT Filed: Jul. 20, 1998

(86) PCT No.: PCT/IB98/01105

§ 371 (c)(1), (2), (4) Date: May 1, 2000

(87) PCT Pub. No.: WO99/05226

PCT Pub. Date: Feb. 4, 1999

(30) Foreign Application Priority Data

Jul. 21, 1997 (EP) .............................. 97810512

(51) Int. Cl.⁷ ...................... C09B 67/02; C09B 67/06
(52) U.S. Cl. ................... 8/524; 8/618; 8/648; 8/673; 8/676; 8/680; 8/681; 8/682; 8/683; 8/684; 8/550
(58) Field of Search ............... 8/524, 526, 648, 8/673, 676, 680, 681, 682, 683, 684, 617

(56) References Cited

U.S. PATENT DOCUMENTS

| | | | |
|---|---|---|---|
| 3,034,848 A | 5/1962 | King ........................ 8/79 |
| 3,583,877 A | * 6/1971 | Rosenblum et al. .... 106/288 Q |
| 4,560,747 A | 12/1985 | Bruttel et al. ................ 534/887 |
| 4,832,700 A | 5/1989 | Kaspar et al. ................. 23/313 |
| 4,846,409 A | 7/1989 | Kaspar et al. ................. 241/21 |
| 4,961,755 A | 10/1990 | Bruttel et al. ................... 8/526 |
| 5,073,295 A | 12/1991 | Bruttel et al. .......... 252/301.19 |
| 5,366,512 A | * 11/1994 | Mischke et al. ............... 8/524 |
| 5,507,991 A | 4/1996 | Mudd ........................ 264/143 |

FOREIGN PATENT DOCUMENTS

| | | |
|---|---|---|
| CH | 492 007 | 6/1970 |
| DE | 1 134 467 | 6/1959 |
| DE | 2 317 175 | 10/1973 |
| DE | 32 48 504 | 7/1983 |
| EP | 0 028 379 | 5/1981 |
| EP | 0 115 634 | 8/1984 |
| EP | 0 264 049 | 4/1988 |
| EP | 0 323 407 | 12/1988 |
| EP | 0 612 557 | 8/1994 |
| FR | 2 373 591 | 7/1978 |
| FR | 2 387 270 | 11/1978 |
| FR | 2 645 164 | 10/1990 |
| GB | 0 952 855 | 3/1964 |
| GB | 1 425 237 | 2/1976 |
| GB | 1 587 210 | 4/1981 |
| GB | 1 567 734 | 5/1981 |
| GB | 2 230 533 | 10/1990 |

OTHER PUBLICATIONS

English abstract for EP 0115634, Aug. 15, 1984.

English abstract for EP 0612557, Aug. 31, 1994.

Lexikon für Textilveredlung, Laumann–Verlag 1995, pp. 797–798.

Chem.–Ing.–Tech. 51 (1979), pp. 996–998.

Applicant's Response to EPO in regards to opposition of EP 1 002 002 B1 filed by Ciba Specialty Chemical Holding Inc., Jul. 7, 2003, X.T. Dancaux.

* cited by examiner

*Primary Examiner*—Charles Boyer
*Assistant Examiner*—Eisa Elhilo
(74) *Attorney, Agent, or Firm*—Scott E. Hanf

(57) ABSTRACT

Granular compacts (G) of a mixture of
(A) at least one water-soluble dye or optical brightener, and
(B) extender and, optionally,
(C) at least one hydrophilic surfactant and/or
(D) further additives, additionally containing
(E) a dust-binding oil,
are low-dust dry formulations of high bulk density which feature good dissolution, transportation and storage properties and are outstandingly suitable for the dyeing of the respective substrates.

11 Claims, No Drawings

GRANULAR COMPACTS, THEIR PRODUCTION AND USE

BACKGROUND OF THE INVENTION

For the selling of dyes and optical brighteners, these substances are commonly formulated to specific concentrations of active substance and in a most readily usable form. Water-soluble dyes and/or optical brighteners can be formulated, for example, in liquid form as concentrated solutions or dispersions, which offers certain advantages in terms of the metering of the products but which on the other hand entails the handling of a large amount of liquid on transportation and storage, which not only occupies transport and storage volume but also, should the containers suffer any damage and the liquid formulation run out, leads to the corresponding consequences. In order to avoid these problems as far as possible, the said water-soluble dyes or optical brighteners can be formulated also as dry products, for example as powders, granules or shaped compacts (tabletted/briquetted or spherical/pelletized). The pulverulent products are often not sufficiently free-flowing and/or tend strongly towards dusting and, occasionally, to accretion as well, which when the containers are handled and the products are used to prepare the corresponding dyeing or brightening baths may lead to corresponding instances of contamination and product loss. To reduce these disadvantages granules have been prepared, principally hollow spheres (via atomizer) or built-up granules, especially fluidized-bed granules. Although there is less dusting with these granules, the mutual abrasion of the individual particles or the bursting of the hollow spheres in the course, for example, of transportation, transfer, etc., may likewise result in powder or dust, so that again when handling the products a certain level of dusting may be caused and/or downwards-flowing abraded powder accumulates in the bottom part of the container and, consequently, the consistency of the product in the container as a whole is not uniform. Fluidized-bed granules, although they do not share with the hollow spheres the disadvantage that they may burst, are fairly laborious to prepare: for the preparation of the fluidized-bed granules the products along with at least a portion of the additives must be admixed with water and then dried in a fluidized-bed granulator, which may have an adverse effect on thermally unstable products as a result, for example, of the heating, and may in addition be disadvantageous for those products which may become tacky under such conditions. Owing to the relatively large amount of voids in the individual grain of the structured granules, a fairly large proportion of any dustproofing agent added penetrates into the voids before an effective amount thereof is present on the exterior surface of the granule. If to circumvent these problems the dyes or brighteners are then formed as coarsely granular compacts (briquettes or pellets, with a size, for example, of from 3 to 10 mm) there may occur the disadvantage of a reduced and irregular rate of dissolution of the active substance in the compacts, with the additional possibility again of powder and dust forming in the packaged dye as a result of capping of the particles.

DESCRIPTION OF THE RELATED ART

In EP-A-0115634 and in EP-A-0612557 there are described certain machines, with which dry products, e.g. dyes may be sprayed with dedusting agents. In EP-A-0115634 is described the treatment of abrasion sensitive products, e.g. of spray dried dyes or of dyestuff hollow beads, in a turning tubular mixer; in EP-A-0612557 is described the treatment of fine particle size solids, among else of dyestuff powders and granules, with a liquid, e.g. a dedusting agent, in a mixer provided with an ultrasonic atomizer.

In EP-A-0028379 and 0264049, FR-A-2387270 and DE-A-3248504 is described the production of water soluble granules by build-up granulation. In FR-A-2387270 (=DE-A- 2716478 ) and in DE-A-3248504 there are described fluidized-bed granulators. In EP-A-0028379 is described the production of fluidized-bed granules by employing certain granulating adjuvants. In EP-A-0264049 is described a multiple stage production of dye build-up granules by mixing-granulation and fluidized-bed drying, while in the introduction of this EP there are indicated some disadvantages of fluidized-bed granulation (such as prolonged permanence and—for the production of high tonnage—large, costly machines).

"In U.S. Pat. No. 5,507,991 is described the production of extrudates from a water/dye mixture (produced by mixing spray dried FD&C dye with water), where after extrusion a drying—e.g. during several hours in an oven at 90 to 130° C.—is required in order to eliminate again the added water, such extrudates, due to their elongated (mostly cylindrical) shape or/and due to the porosity resulting by the water evaporation in drying, are however not particularly stable, and in transportation arid transfer they may break rather easily and consequently dust is also formed. In this U.S. Pat. No. 5,507,991 in the introduction (column 2, lines 55–60) there is also indicated that compaction and granulation products are highly vulnerable to the effects of abrasion and disintegration, which means that they would not be usable in practice. From FR-A-2645164 is known an extrusion of nearly dry product, in which before extrusion a dedusting agent is also admixed; these extrudates are however of a less dense packing and consequently are also less stable and tend still more to breaking in moving (transportation, transfer from one vessel to another)."

From U.S. Pat. No. 3,583,877 it is known to produce pelletized or briquetted basic dyes, which display the above mentioned disadvantages e.g. in the speed of dissolution and in the shape stability on transportation and transfer.

In U.S. Pat. No. 3,034,848 there is described the compaction of certain dyes which are soluble in gasoline but not soluble in water.

From CH-A-492007 it is known to mix dyestuff powder in the presence of ice shivers and of a binder, by which there are obtained non-compacted crumby products of very fine particle size; this physical form is aimed at in order to achieve a sufficient solubility and speed of dissolution, while the production of larger sized particles, such as granules, briquettes and tablets, is designated as being of disadvantage due to their bad solubility in water and their properties deviating from those of the starting products (column 1, lines 25–30).

In DE-A-3248504 there is described a process for the production of fluidized-bed granules of water soluble substances, among else of dyes, and the introduction of the description (page 3, 2nd paragraph) advises against particles with a hard surface (these comprise for instance the above mentioned tablets and briquettes, but also in general further compaction or extrusion products) because these dissolve very badly, so that the required speed of dissolution is not achieved.

SUMMARY OF THE INVENTION

It has now, surprisingly and despite the above mentioned prejudices, been found that granules of water-soluble dyes or optical brighteners, obtainable by dry compaction (densification), especially by means of roll presses, and granulation, as are described and defined below, are notable for their stability and rate of dissolution and for their low dust content even after repeated transportation and transfer of the drums or packs, it being possible to avoid the laborious mixing with water and evaporation required for fluidized-bed granules.

DESCRIPTION OF PREFERRED EMBODIMENTS

The invention relates to the compacted granular products, their production and their use.

The invention therefore firstly provides a compacted granulated product (G) of a mixture of
- (A) at least one water-soluble dye or optical brightener and
- (B) extender and, optionally,
- (C) at least one hydrophilic surfactant and/or
- (D) further additives, additionally containing
- (E) a dust-binding oil.

As active substance, i.e. as component (A), in the granular product (G) of the invention it is possible to employ any desired water-soluble dyes or optical brighteners, especially dyes or optical brighteners which are soluble at room temperature (=20° C.) and in water to at least 1 g/l and are soluble to at least 5 g/l under application conditions.

The following dye and brightener groups may be mentioned in particular as (A):

(A1) anionic dyes containing at least one water-solubilizing anionic substituent, especially at least one sulphonic acid group or carboxylic acid group, preferably in salt form (alkali metal salt and/or ammonium salt), or at least one metal complex group or at least one thiolate or oxolate group. Such dyes or optical brighteners are general knowledge in the art and are widely described in the technical literature, in particular as direct dyes, acid dyes, reactive dyes, mordant dyes, development dyes, vat dyes and sulphur dyes, e.g. the designations under which they appear in the Colour Index, the water-soluble form of the vat dyes being the leuco form, and the water-soluble form of the sulphur dyes likewise being the leuco sulphur dye form or also the Bunte salt form. For the granulation of the invention particular preference is given among these to the direct dyes, the acid dyes and the reactive dyes (including metal complexes), which contain at least one, preferably two or more water-solubilizing substituents, especially sulpho groups, per molecule; some metal complex dyes are of sufficient solubility in water even without such substituents.

(A2) Dyes with a cationic character which contain at least one quaternary ammonium group or protonated or protonizable amino group (for example even as part of a heterocycle) and which, if they contain two or more cationic substituents, may also include one or more anionic substituents. Dyes of this kind are likewise known in the art and described widely in the technical literature, for example in the Colour Index under the designation "Basic Dyes".

(A3) Water-soluble, nonionic dyes whose molecule contains water-solubilizing groups and substituents, principally carbamoyl groups and sulphamoyl groups, which may be substituted or unsubstituted.

(A4) Water-soluble optical brighteners. These can be anionic or cationic brighteners which comprise water-solubilizing anionic substituents, principally sulpho groups, or cationic substituents, principally quaternary ammonium groups or protonated or unprotonated amino groups or nitrogen-containing basic heterocycles. The optical brighteners are also well known in the art and widely described in the technical literature, for example in the Colour Index under the designation "Fluorescent Brighteners".

The dyes or optical brighteners (A) can be employed in the form in which they have been prepared, following filtration and, if desired, washing of the filter cake and drying, or also as powders. The water-soluble dyes and optical brighteners can if desired be purified or desalinated by membrane filtration, in the form of their salt-containing solutions and/or their solutions containing by-products, and in the form of the purified concentrated solutions can be combined with (B) and, if desired, (C) and/or (D), and then dried. If (A) is obtained in highly pure form and/or, if any by-products present and/or any salt content hailing from the preparation are not disruptive in the end product, the dyes and/or optical brighteners (A)—directly in the solutions in which they have been formed or after dissolving the filter cake in water under suitable pH and temperature conditions—can be combined as required with (B) and preferably (C) and, if desired, (D) and then dried. It is also possible to paste up the filter cake with a solution containing (B) and/or preferably (C) and, if desired, (D) and then to dry the resulting aqueous mixture. Drying is preferably carried out first, in the presence or absence of (B) and/or (C), followed by mixing with the remaining components, or the press cake is mixed with the optional further additives (B), (C) and/or (D).

As extender (B) come principally into consideration:

(B1) electrolytic extenders, in particular salts, prrincipally alkali metal salts, magnesium salts and/or ammonium salts of mineral acids or low-molecular-mass aliphatic carboxylic acids (e.g. $C_{2-6}$), examples being chlorides, sulphates, carbonates or phosphates, preferably lithium, sodium or potassium chloride, magnesium chloride, sodium sulphate (e.g. as Glauber's salt), sodium or potassium carbonate and, especially as buffer substances, mono- or disodium phosphate and/or mono- or dipotassium phosphate;

(B2) non-electrolytic extenders, especially nonionic extenders, examples being oligo- or polysaccharides (e.g. dextrins), amids, polyglycerols, polyvinyl alcohols, polyethylene glycols (Carbowaxes) having a molecular weight >300, especially in the range from 600 to 2000, polyvinylpyrrolidones and, optionally, urea.

Salts of type (B1) may (at least in part) already result from in the preparation of water-soluble dyes or optical brighteners, especially sodium chloride and/or Glauber's salt, and/or can be added as extender components. Nonionic additives of type (B2) are particularly suitable when water-soluble dyes and/or optical brighteners have been obtained in substantially salt-free form (for example, by membrane filtration or by acidification and/or extraction).

Depending on the desired concentration of water-soluble dye and/or optical brightener in (G), the content of (B) in (G) may vary. The weight ratio (B)/(A) is, for example, in the range from 1/100 to 9/1, especially from 1/50 to 5/1 and, preferably, in the range from 1/10 to 2/1.

Suitable surfactants (C) are those in which the hydrophilic character is predominant and which are at least colloidally soluble in water, especially those which act as wetting agents. The ionicity of the surfactants is arbitrary; in particular (C1) non-ionogenic surfactants, especially adducts of ethylene oxide and, if desired, propylene oxide with aromatic and/or aliphatic hydroxy, carboxy or carbamoyl compounds which contain at least one lipophilic hydrocarbon radical, the lipophilic radicals being, for example, aliphatic radicals having 9 to 24, preferably 12 to 20 carbon atoms, as are derived, for example, from corresponding fatty acids, or being alkyl-substituted phenyl radicals which as substituents carry one or two alkyl radicals having a total of 4 to 18 carbon atoms, especially one or two $C_{4-9}$-alkyl radicals or one $C_{8-12}$-alkyl radical, as are derived from corresponding alkyl-substituted phenols, or styrylphenol. Mention may be made in particular of: adducts of ethylene oxide and, if desired, propylene oxide with fatty alcohols, alkylphenols, fatty acids, fatty acid amides, fatty acid diethanolamides or diisopropanolamides, fatty acid mono- or diglycerides, sorbitan mono- or di-fatty-acid esters or castor oil. The number of moles of ethylene oxide per mole of hydroxy compound is suitably chosen such that the resulting surfactant is markedly hydrophilic in nature, preferably with an HLB $\geq 7$, for example in the range from 7 to 16, preferably from 8 to 14. If adduct formation takes place with propylene oxide as well, its amount is judiciously chosen so as not to impair the hydrophilic nature of the surfactant, preferably such that the ethyleneoxy units predominate over the propyleneoxy units. Before all are preferred fatty acid polyglycolesters and adducts of ethylene oxide with fatty alcohols and alkylphenols.

(C2) Anionactive surfactants, especially those which comprise at least one hydrophilic anionic group, for example a sulphonic acid or sulphuric ester group, a phosphonic acid or phosphoric ester group or a carboxylic acid group, and in which the lipophilic radicals contain, for example, 7 to 24 carbon atoms, or also derive from unsubstituted or substituted naphthalenesulphonic acids and/or benzene compounds. Examples which may be mentioned are as follows: alkylbenzenesulphonates, alkylphenol sulphates and mono- or dialkyl-substituted sulphosuccinates in which the alkyl radicals contain, for example, 1 to 18, preferably 1 to 12 carbon atoms, $C_{9-24}$-alkanesulphonic acids, $C_{9-24}$ fatty alcohol sulphates, ligninsulphonates, sulphated castor oil, petroleum sulphonates, $C_{13-16}$ paraffin sulphonates, condensation products of formaldehyde with unsubstituted or mono- or di-$C_{1-4}$-alkyl-substituted naphthalenesulphonic acids and, optionally, phenols and/or sulphonated phenols, toluenes, diphenyl ether and/or ditolyl ether, fatty acids (soaps) or also sulphated, phosphated or carboxymethylated derivatives of non-ionogenic surfactants of the type (C1). The anionic surfactants are preferably in the form of their alkali metal salts, magnesium salts or ammonium salts, most simply as sodium salts, potassium salts or ammonium salts.

(C3) Cationactive surfactants, for example those which contain at least one lipophilic radical as defined above and at least one primary, secondary or tertiary basic amino group, which may be protonated, or a quaternary ammonium group. Examples which may be mentioned are fatty amines or fatty aminoalkylamines, which following reaction with epichlorohydrin may have been alkylated with methyl, benzyl and/or ethyl, and/or may have been reacted with ethylene oxide and, if desired, propylene oxide, and which may have been quatemized; acylation products of alkylenediamines, dialkylenetriamines or trialkylenetetramines or of hydroxyalkylalkylenediamines which comprise at least one basic nitrogen and which may have been alkylated and/or reacted with ethylene oxide and, if desired, propylene oxide and which may have been quatemized; the alkylene chains between two nitrogen atoms contain, for example, 2 to 6 carbon atoms, preferably 2 or 3 carbon atoms, the hydroxyalkyl radicals are, for example, ethanol or isopropanol; acylation products of ethylenediamine, diethylenetriamine or ethylenepropylenetriamine can if desired be cyclized to the corresponding imidazolines, and the basic nitrogen of the imidazoline ring can, if desired, be quaternized.

Since dyes (or optical brighteners) and surfactants of opposite ionicity may tend to precipitate each other, preferred combinations are between anionic dyes or optical brighteners and anionic surfactants and/or non-ionogenic surfactants, and between dyes or optical brighteners of cationic or basic character and cationic surfactants and/or non-ionogenic surfactants.

Optionally it is also possible to employ mixtures of non-ionogenic surfactants with anionactive or cationactive surfactants.

The weight ratio of the surfactants (C) to the dye or brightener (A) is, for example, in the range from 0.01/100 to 100/100, advantageously in the range from 0.05/100 to 50/100 and, preferably, in the range from 0.1/100 to 10/100.

As additives (D) come into consideration other formulating additives, in particular the commonly known substances as can be added, in particular, as preservatives, primarily for the formulations, or formulating assistants, primarily for stock solutions or baths, especially (D1) fungicides, bactericides and/or defoamers, (D2) solubilizers and (D3) builders.

As fungicides and bactericides (D1) come into consideration in general known products, e.g. commercially available products, which may be employed in the respective recommended concentrations. As defoamers (D1) come also into consideration in general known products, e.g. commercially available products, which may be employed in the respective recommended concentrations.

As (D2) come into consideration in general known products having solubilizer properties, including, for example, those specified below under (E1).

As (D3) come into consideration conventional complexing agents as can be used to bind ions which form hardness in water, and iron ions in aqueous baths, primarily aminopolycarboxylic acids, aminopolymethylenephosphonic acids or polymeric carboxylic acids, for example nitrilotriacetic acid, ethylenediaminetetraacetic acid, diethylenetriaminepentaacetic acid or -pentamethylenephosphonic acid, (co)poly(meth)acrylic acids and (meth)acrylic acid/maleic acid copolymers, which are employed advantageously in alkali metal salt form (preferably sodium salt form).

The components (D) can be present in (G) in small amounts, as are customary for dye formulations, relative to (G), for example in the range from 0 to 10, primarily from 0 to 5 per cent by weight. The content of preservative and defoamer (D1) in (G) is, for example, in the range from 0 to 2 per cent by weight; the content of solubilizer (D2) in (G) is, for example, in the range from 0 to 5 per cent by weight—if (D2) are employed, from 0.2 to 2 per cent by weight, based on (G), are preferably present; the weight ratio (D2)/(A) in this case is advantageously in the range from 0.004/1 to 0.2/1; the content of (D3) in (G) is, for example, in the range from 0 to 5% by weight.

Based on the sum of (A)+(B)+(C)+(D) (which is set here=100%) the content of (A) is advantageously ≧10% by weight, primarily in the range from 10 to 80 per cent by weight, preferably from 20 to 75 per cent by weight; the content of (C) is advantageously in the range from 0.1 to 10 per cent by weight, preferably from 0.2 to 4 per cent by weight; the content of (D) is advantageously in the range from 0 to 5 per cent by weight; and the content of (B) is the remainder to 100 per cent by weight. The weight ratios of components (B), (C) and (D2) to (A) are advantageously within the ranges stated above.

Components (A), (B) and, if desired, (C) and, if present, (D) can be combined with one another in dissolved form and then dried prior to compaction (densification), or—preferably—components (C) and, if present, (D) can also be combined with dried (A) and (B) or else mixed with a moist filter cake containing (A) and (B) and then, if required, can be dried prior to compaction or densification. By dry product is meant herein, in general, a product which contains ≦15% by weight, in particular ≦7% by weight, of water which is not chemically bonded, i.e. water which can be removed by subsequent drying.

Component (E) is suitably added after the drying stage, in particular even after the compaction stage and even after the adjustment of the particle size. According to a particular feature of the invention (D1) may also be added after adjustment of the particle size.

Products suitable as (E) are viscous, water-soluble products, and oils which are not water-soluble per se, in the presence, for example, of appropriate emulsifiers. Particularly suitable as (E) are:

(E1) low-molecular-mass polyols, e.g. diols or triols, in particular having 2 to 6 carbon atoms, or their mono-lower-alkyl ethers, e.g. glycerol, $C_{2-6}$-alkylene glycols, oligo-($C_{2-4}$-alkyl-ene) glycol ethers and $C_{1-4}$-alkyl monoethers thereof, preferably mono- or dipropylene glycol monomethyl ether;

(E2) polyethylene glycols having an average molecular weight ≧150, for example in the range from 150 to 900, with preference being given to the liquid grades, especially those with an average molecular weight in the range from 170 to 600;

(E3) hydrophobic oils, which may be combined, for example, with an emulsifying surfactant system, examples being hydrocarbon oils (primarily aliphatic and/or araliphatic oils, e.g. paraffin oil, mineral oil and/or phenylalkanes) in combination with emulsifying surfactants, for example the abovementioned surfactants, examples being fatty acids and/or soaps; triglycerides, which may have been hydrogenated, e.g. palm oil, castor oil or coconut oil and may likewise be combined with surfactants as set out above, or also fatliquoring oils, as are otherwise used for the fatliquoring of leather, and which may have been at least partly modified for emulsifiability by, for example, hydrolysis, transesterification and/or introduction of sulpho groups (by sulphation, sulphitation or sulphonation).

The products (E1) and (E2) are in general water-soluble. The products (E3) are advantageously combined with sufficient surfactant, or hydrophilically modified to such a degree, that they are self-emulsifiable in water. To emulsify the hydrophobic oils the corresponding emulsifiers are employed in effective amounts, suitably in amounts which are sufficient for the respective oils to be emulsified by simply pouring the oil/emulsifier mixture into water, and/or at least in amounts such that the oils adhere to the dry granules without smearing, i.e. act as interface-active agents between the oily phase and the solid phase (granule). Surfactants advantageously employed are those as set out above under (C). Their quantitative ratio to the oils is, for example, in the range from 0.01/1 to 1/1, advantageously from 0.02/1 to 0.5/1 and, preferably, from 0.03/1 to 0.2/1. In another embodiment of the invention, the oils (E3) are not combined with surfactants.

If a surfactant-containing oil (E3) is employed as (E) it is possible, if desired, to add at least some of the surfactants (C) in the form of (E). If desired, all of the surfactant (C) can be added in the form of (E3).

In one embodiment of the invention the substance employed as (E) comprises those mixtures (E3) in which the oil is a hydrocarbon oil or a mixture of hydrocarbon oils which also has a foam-inhibiting effect, so that it may be possible to omit any separate addition of a defoamer as (D1).

The dust-binding additives (E) are judiciously employed in an effective amount. The granular products (G) contains, for example, from 0.05 to 10 per cent by weight of (E), advantageously from 0.1 to 6% by weight of (E) and, preferably, from 0.1 to 3% by weight of (E).

The dry mixture of (A) and (B) and also, if added—at least in part—prior to compaction, (C) and, if desired, (D) can be compacted by means of conventional pressure compaction machines, examples being trace presses or, preferably, roll presses, where the dry product to be compacted is fed in advantageously by means of a worm (filling screw). It is particularly advantageous to use apparatus in which the material to be compacted is fed in by a worm between the press rolls, so that precompaction takes place in the worm and further compaction is carried out between the press rolls. The compacting action can be influenced by the nature and fitment of the apparatus, primarily by the nature of the rolls and, in particular, by the pressure between the rolls, and it is judicious to choose the appropriate rolls, preferably corrugated rolls, e.g. sheet-producing rolls with finely to coarsely corrugated roll surfaces (fine-corrugated rolls are preferred in accordance with the invention). The diameter of the rolls may vary depending on the size of the assembly, e.g. in the range of 12 cm to 1 m, it being mostly possible to achieve satisfactory yields already with rolls of a diameter in the range of 12 to 50 cm, e.g. with rolls of a diameter preferably in the range from 12 to 30 cm, especially 25 cm, or even higher, in particular 35 cm. The roll pressure in the press-roll devices is advantageously >0.4 t/cmRL and can vary widely e.g. in the range from 0.4 to 18 t/cmRL (t/cmRL=tonnes per cm of roll length), for a roll diameter of 152 mm, the roll pressure changing in proportion to the roll diameter in accordance with the equation $$\frac{p_1}{p_2} = k \cdot \frac{d_1}{d_2}$$

in which
$d_1$ is the diameter of the roll 1,
$d_2$ is the diameter of the roll 2,
k is a constant typical for the system,
$p_1$ is the roll pressure for the roll 1 and
$P_2$ is the corresponding roll pressure for the roll 2.

The constant k is in general ca.=1 or deviates little from 1. Mostly k=1 can be taken for calculation.

For the preparation of the granular compacts (G) of the invention, preference is given to roll pressures (referred to a roll diameter of 152 cm) <9 t/cmRL, in particular ≦6 t/cmRL. It is advantageous to operate with a roll pressure $\geq 0.6$ t/cmRL, preferably in the range from 0.6 to 3 t/cmRL (referred to a roll diameter of 152 cm), it being possible to produce granular products (G) of outstanding quality already at roll pressures $\leq 2$ t/cmRL. In an advantageous procedure the density of the compacted product (slug or sheet density) is as high as possible, especially $\geq 1$ g/cm$^3$ in the form as yet untreated with (E).

Compaction takes place advantageously without external supply of heat except, if appropriate, for the endogenous heat generated by the pressure of compaction; this may give rise to a temperature increase of up to 30° C., for example, preferably $\leq 15°$ C.; compaction takes place advantageously at temperatures in the range from 15 to 60° C., preferably from 20 to 40° C. If desired it can be carried out under vacuum and/or with roll cooling.

The strand (from a stuffer) or sheet or slug (from press rolls) which result from compaction are then comminuted in an appropriate granulator, optionally after coarse fractionation of the strand or sheet (or slug), and the onsize (=granules of the desired particle size) is separated from any undersize and/or oversize (=granules with a particle size finer or coarser than the desired particle size); in particular, it is screened through 2 or more sieves to the desired onsize. The sieves (or sieve inserts) are chosen such that the particle size of the onsize is within the desired range, primarily in the range from 0.1 to 3 mm, with any oversize retained in the first sieve being passed back for comminution and the undersize which has passed through the last sieve being passed back for (pre)compaction. The compacted granular products (G) of the invention are advantageously small- to medium-sized, preferably of a granule size <3 mm, e.g. <1.5 mm, and advantageously >0.3 mm, in particular in the range of 0.3 to 1.2 mm, preferably 0.3 to 1 mm, with particular preference 0.4 to 1 mm.

The granulators are advantageously chosen so as to give granules which do not exceed the maximum particle size.

Dry compaction/granulation can be carried out in known machines. Examples of suitable machines are compacting machines of Compactor series K ("Kompaktor Baureihe K") from BEPEX GmbH (Leingarten, Germany) or compacting/granulating machines of type WP 50/75, WP 170V Pharma or WP 150/250 or WP 150/250V from ALEXANDER-WERK AG (Remscheid, Germany). The granulator may include, or be followed by, a system for removing fine dust. By removing fine dust, which may form when shhets or slugs break and/or are granulated, it is possible to reduce the required or optimum amount of (E) to a minimum, e.g. $\leq 2\%$ by weight of (E) based on (G).

Treatment with (E) takes place suitably following separation of the onsize from undersize and oversize. Advantageously, the granulated product is sprayed with (E) and, at the same time and/or thereafter, is mixed with (E) in order to improve the distribution and combination of (E) on the granule surface.

The overall apparatus can have a composition such that the compactor (preferably a pair of pressure rollers with worm-type precompactor) leads directly to the granulating apparatus (granulator with or without pregranulator, and attached sieving unit for separating the onsize material from oversize and undersize), and the exit for onsize material leads to the mixing apparatus for combination with (E). The resulting granular product (G) treated with (E) can be stored, for example, in a silo from which the respective containers for conveying the granules can then be filled, examples being drums (e.g. metal drums or containers made from cardboard or chipboard) or tanks (e.g. road tankers or tanks suitable for rail transport). By taking appropriate precautions, which are known per se, the entire process of compaction, granulation, recycling of undersize and, if present, oversize, etc., can be carried out substantially without dust, and in particular continuously, by conducting the process in appropriately sealed apparatus and using appropriate dust-collecting filters operating, for example, with reduced pressure.

The granular compacts (G) of the invention are notable for their low dust content and stability on transportation and storage, and feature an optimum, or sufficient, rate of dissolution, as is suitable for use in dyeing operations. They can be prepared very simply and economically and have the advantage that the particularly high bulk density of the product (e.g. >0.5 g/cm$^3$, especially 0.8 to 1.2 g/cm$^3$) entails a minimum of transport and storage volume. There may be produced granular compacts (G) of particularly high bulk density, e.g. distinctly higher than 0.5 g/cm$^3$, in particular distinctly higher than 0.55 g/cm$^3$, e.g. up to 1.2 g/cm$^3$, principally in the range of 0.7 to 1.2 g/cm$^3$, preferably 0.8 to 1 g/cm$^3$. Of particular relevance is the possibility of producing granular products (G) the bulk density of which e.g. above 0.7 g/cm$^3$, advantageously above 0.8 g/cm$^3$.

The products (G) are notable for their low dust content and their free-flowability, even after prolonged storage, repeated transfer and/or transportation (shaking storage), which represents also a marked improvement in the meterability of the product.

The granular compacts (G) of the invention can be dissolved directly by pouring them into water, with stirring; their rate of dissolution is such that with gentle stirring they dissolve in water within a short period, better than the corresponding powder. They are also easier to wet, show practically no caking when scattered in and, consequently, offer better metering possibilities. The preferred small-size particle granular products of the invention, especially those with a particle size scatter over the entire range from 0.3 to 1 mm, especially also 0.4 to 1.2 mm, exhibit an optimum combination of bulk density and rate of dissolution, so that when the product is poured onto the solution water the individual granules, directly or after a very brief period of floatation on the surface of the water, sink into the solution water and in doing so dissolve, with an optimum homogeneous solution of the dye or brightener being obtained very rapidly with gentle stirring. In this way it is possible with the minimum of effort and the maximum of effect to prepare stock solutions and reinforcing baths; it is also possible directly to prepare concentrated impregnating baths and inks, and also printing pastes or even dyeing or brightening baths. For the dyeing or optical brightening of paper after sheet-formation, the dyes or optical brighteners can likewise be added directly to the dyeing or brightening bath with an appropriate high rate of dissolution.

By the granulation of the invention the dyeing properties of the active substances (A) are practically not impaired, it being possible to operate in a substantially dust-free procedure, which is of particular value for the continued cleanliness of the apparatus and immediate surroundings, and permits the dyer to work in an environment which is practically free from dye dust, using relatively small volumes of dry dye.

In the following examples parts and percentages are by weight; the temperatures are indicated in degrees Celsius. The compacting/granulating machines are those from the company ALEXANDERWERK AG (Remscheid, Germany). "C.I." stands for "Colour Index"; "kN/cmRL" stands for "kilonewtons per cm of roll length" and "rpm" stands for "revolutions per minute". The dustproofing oil (E31) is a mixture of 93.8 parts of a blend of approximately equal parts of paraffin oil and dodecylbenzene, 5.9 parts of a fatty acid polyglycol ester, with 0.26 part of oleic acid and 0.04 part of diethylaminoethanol. The defoamer (D11) is a dispersion of 2.4 parts of stearic acid ethylenediamide and 1.2 parts of paraffin with a melting point of 54–56° C. in 72 parts of a mineral oil fraction having a boiling point of 325–450° C., with 21 parts of a purified fatty acid polyglycol ester and 2 parts of hexylene glycol.

EXAMPLES

Example 1

100 parts of the filter cake obtained from the synthesis of the blue acid dye C.I. Acid Blue 129 (Constitution No. 62058) by salting out with sodium chloride and filtration (and containing 50% of pure dye as the sodium salt, 30% of water and 20% of sodium chloride along with by-products) are mixed thoroughly with 6 parts of a 35% solution of the adduct of 10 mol of ethylene oxide with 1 mol of octylphenol, and the resulting mixture is then dried and finely ground. The resulting powder is compacted in a compacting/granulating machine WP 50/75 (roll length 75 mm, roll diameter 152 mm) at a roll pressure of 16.0 kN/cmRL and a rotary speed of 8 rpm to give a slug 2.0 mm thick, and this slug is granulated to give small particulate granules (from 0.3 to 1 mm particle size). The roll throughput is 31 kg/h, the output of onsize 23 kg/h and the proportion of undersize 25.8%. The undersize is passed back for compaction. The onsize obtained is sprayed and mixed with 0.8 part of dustproofing oil (E31). The resulting compacted granular dye (dye compact) is readily soluble in water and notable for its low dust content, stability on storage and transportation, and speed of dissolution.

Example 2

Analogously as described in Example 1, a mixture of 100 parts of a direct dyes mixture of C.I. Direct Brown 240, C.I. Direct Red 83:1, C.I. Direct Blue 90 and C.I. Direct Yellow 162 in the weight ratio of 9:5:14:2 with 2 parts of urea, 5.5 parts of lignine sulphonate, 0.4 parts of sulphated oleic acid ester ad 10–15 parts of sodium sulphate is compacted and granulated in the compactor/granulator WP 50/75 and the resulting granules are then sprayed and mixed with (E31), the roll pressure being 16 kN/cmRL, the rotary speed 8 rpm and the thickness of the resulting slug 4 mm; the roll throughput is 120 kg/h, the output of onsize is 70 kg/h and the proportion of undersize is 41.7%. The resulting granular product (dye compact) is readily and homogeneously soluble in water and notable for its speed of dissolution, low dust content, and stability on storage and transportation, and can be employed as a black direct dye. Its bulk density is about twice the one of a corresponding powder, and it is pourable.

Example 3

Analogously as described in Example 1 or 2, a mixture of 100 parts of an acid dyes mixture of C.I. Acid Blue 278, C.I. Acid Blue 225, C.I. Acid Violet 47 and C.I. Acid Violet 48 in the weight ratio 4.5:3.6:3:1 with 0.2 parts of urea, 1.5 parts of sulphated oleic acid ester and 20 parts of dextrine is compacted and granulated and then sprayed and mixed with (E31), with the roll pressure in the compactor/granulator WP 50/75 being 14.4 kN/cmRL, the rotary speed 8 rpm, the slug thickness 2 mm, the roll throughput 35 kg/h, the output of onsize 25 kg/h and the proportion of undersize 27.8%. In the WP 250/150 unit the roll pressure is 24 kN/cmRL, the rotary speed is 14 rpm, the slug thickness is 2.4 mm, the roll throughput is 242 kg/h, the output of onsize is 175 kg/h and the proportion of undersize is 27.8%. The resulting granular product (dye compact) is readily soluble in water and is notable for its speed of dissolution, low dust content, and stability on transportation and storage, and can be employed as a blue acid dye. Its bulk density is about twice the one of a corresponding powder, and it is pourable.

Example 4

The procedure is as described in Example 3 with the difference that in the WP 50/75 unit the roll pressure is 16 kN/cmRL, the slug thickness is 4.8 mm, the roll throughput is 64 kg/h, the output of onsize is 44 kg/h and the proportion of undersize is 31.9%, or the WP 250/150 unit is operated in the same way as in Example 3 with the difference that the roll pressure is 26.7 kN/cmRL, the slug thickness is 5.8 mm, the roll throughput is 441 kg/h, the output of onsize is 301 kg/h and the proportion of undersize is 31.9%. Again, a readily soluble granular product (dye compact) is obtained which is notable for its speed of dissolution, and its low dust content and stability on storage and transportation.

Example 5

Analogously as described in Example 4, the black reactive dye C.I. Reactive Black 8 is compacted and granulated and then sprayed and mixed with (E31), the roll pressure in the WP 50/75 unit being 16 kN/cmRL, the rotary speed 8 rpm, the slug thickness 4 mm, the roll throughput 100 kg/h, the output of onsize 63 kg/h and the proportion of undersize 37%. The WP 250/150 unit is operated in an analogous manner, with the roll pressure being 26.7 kN/cmRL, the rotary speed 14 rpm, the slug thickness 4.8 mm, the roll throughput 691 kg/h, the output of onsize 435 kg/h and the proportion of undersize 37%. The compacted, granulated black reactive dye obtained (dye compact) is notable for its ready solubility and speed of dissolution, and for its low dust content and stability on storage and transportation. Its bulk density is about twice the one of a corresponding powder, and it is pourable.

Example 6

Analogously as described in Examples 1 to 5, a mixture of a direct dyes mixture of C.I. Direct 83:1, C.I. Direct Blue 251 and C.I. Direct Yellow 162 in the weight ratio 6.6:1:7:1.2 with 2 parts of urea and 0.3 parts of a sulphated oleic acid ester is mixed with such a quantity of sodium sulphate and sodium bicarbonate that in the total mixture the $Na_2SO_4$-content is 20% and the $NaHCO_3$-content is 20%; then the mixture is compacted and granulated in the WP 50/75 unit and then sprayed and mixed with (E31), the roll pressure being 12 kN/cmRL, the rotary speed 8 rpm, the slug thickness 4 mm, the roll throughput 115 kg/h, the output of onsize 68 kg/h and the proportion of undersize 41.37%. An analogous procedure is carried out in the WP 250/150 unit, with the roll pressure being 20 kN/cmRL, the rotary speed 14 rpm, the slug thickness 4.8 mm, the roll throughput 794 kg/h, the output of onsize 466 kg/h and the proportion of undersize being 41.3%. The resulting compacted granular product (dye compact) of the black direct dye is readily soluble in water and notable for its speed of dissolution, low dust content, and stability on storage and transportation, and it can be employed as a black direct dye. Its bulk density is about twice the one of a corresponding powder, and it is pourable.

Example 7

92 parts of the filter cake obtained from the synthesis of the red reactive dye C.I. Reactive Red 190 by salting out with sodium chloride, filtration and pressing off (comprising 67% pure dye as the sodium salt, 25% of water and 8% of sodium chloride, together with by-products) are stirred up with 70 parts of water, 10 parts of a refined sodium ligninsulphonate of high molecular mass, 8 parts of sodium sulphate and 5 parts of urea are added, and the mixture is stirred together until homogeneous. Via spray drying a powder is obtained which contains about 7% water. This powder is compacted in a compacting/granulating machine type WP 50/75 (roll length 75 mm, roll diameter 152 mm) at a roll pressure of 11 kN/cmRL and a rotary speed of 8 rpm, to give a slug 3.0 mm thick, and this slug is granulated to give small particulate granules (0.3–1.0 mm particle size). The ouptut of onsize is about 35 kg/h, the proportion of undersize is about 34% of the total amount and is passed back for recompaction (separation by screening and sifting). 1 part of a dustproofing oil (E31) is then sprayed onto 99 parts of the resulting onsize, and mixed. The resulting granular dye (dye compact) is notable for its outstandingly low dust content and for its good dissolution properties. No changes occur in these properties even after prolonged storage, for example at room temperature for 6 months or at 40° C. for 5 weeks, and after transportation. Owing to its ideal free-flow properties, the granular product can be metered readily using automatic units. The dye in the granular form described above gives dyeings equivalent to those in the powder form.

Analogously as with the compacting/granulating machine WP 50/75, the above-described powder can also be compacted and granulated with the compacting/granulating machine WP 250/150 (roll length=150 mm, roll diameter=250 mm), with the roll pressure being 18 kN/cmRL, the rotary speed 14 rpm and the slug thickness 3.7 mm. The throughput now corresponds to the output of onsize: 240 kg/h; the proportion of undersize is about 34% of the total amount. The granules are subsequently treated as described above. The resulting granular dye (dye compact) is notable for its outstandingly low dust content and good dissolution properties. No changes occur in these properties even after prolonged storage, for example at room temperature for 6 months or at 40° C. for 5 weeks, and after transportation. Owing to its ideal free-flow properties the granular dye can be metered readily using automatic units. It gives dyeings equivalent to those of the powder form.

Example 8

120 parts of the filter cake obtained from the synthesis of the red reactive dye C.I. Reactive Red 243 by salting out with sodium chloride, filtration and pressing off (comprising 37% pure dye as the sodium salt, 53% of water and 10% of sodium chloride, together with by-products) are stirred up with 50 parts of water, 17 parts of sodium sulphate (Glauber's salt) and 17 parts of a naphthalenesulphonic acid-formaldehyde condensation product are added, and the mixture is stirred together until homogeneous. Following the spray-drying of the suspension, the resulting powder, which contains about 6% water, is compacted and granulated as described in Example 1, with the slug thickness in the roll compactor WP 50/75 being 4.8 mm, and the output of onsize about 44 kg/h; the proportion of undersize is about 32% of the total amount and is passed back for recompaction (separation by screening and sifting). The onsize is sprayed and mixed with 2% of the dustproofing oil (E31). The compacted granular dye (dye compact) thus obtained is notable for its outstandingly low dust content and good dissolution properties. No changes occur in these properties even after prolonged storage, for example at room temperature for 6 months or at 40° C. for 5 weeks, and after transportation. Owing to its ideal free-flow properties the granular dye can be metered readily using automatic units. The dye in the granular form described above gives dyeings equivalent to those in the powder form.

Example 9

The procedure is as in Example 8 except that a further 0.5 part of the defoamer (D11) is added before the suspension is dried. The resulting compacted granular dye (dye compacts) is notable for its outstandingly low dust content and good dissolution properties. No changes occur in these properties even after prolonged storage, for example at room temperature for 6 months or at 40° C. for 5 weeks, and after transportation. Owing to its ideal free-flow properties the granular dye can be metered readily using automatic units and, when the granular dye is used in aqueous solution, there is no disruptive foaming. The granular dye gives dyeings equivalent to those of the powder form.

Example 10

The filter cake obtained from the synthesis of the red reactive dye C.I. Reactive Red 243 by salting out with sodium chloride, filtration and pressing off (comprising 37% of pure dye as the sodium salt, 53% of water and 10% of sodium chloride along with by-products) is dried and ground. 17 parts of sodium sulphate (Glauber's salt) and 17 parts of a naphthalene-sulphonic acid/formaldehyde condensation product are added to 57 parts of this powder (for example in a Nauta mixer), and the components are mixed homogeneously. 0.5% of the defoamer (D11) is sprayed onto this mixture, and mixed.

In the same way as for the powder of Example 8 and 9 this mixture is then compacted, granulated and treated with the further additives. The resulting compacted granular dye (dye compact) is notable for its outstandingly low dust content and for its good dissolution properties. No changes occur in these properties even after prolonged storage, for example at room temperature for 6 months or at 40° C. for 5 weeks, and after transportation. Owing to its ideal free-flow properties, the granular dye can be metered readily using automatic units and, when the granular dye is used in aqueous solution, there is no disruptive foaming. The granular dye give dyeings equivalent to those of the powder form.

Example 11

100 parts of the filter cake obtained from the synthesis of the green acid dye C.I. Acid Green 40 by filtration and washing with an 8% strength NaCl solution (the filter cake comprising 51% of pure dye as the sodium salt, 45% of water and 4% of sodium chloride, along with by-products) are stirred up with 170 parts of water and 10 parts of sodium sulphate (Glauber's salt) and mixed with 3.6 parts of a 35% strength solution of the adduct of 9 mol of ethylene oxide with 1 mol of nonylphenol. Dye agglomerates are disrupted by wet milling (via a Fryma mill, for example). This suspension is spray-dried to give a powder containing about 6% water. This powder is compacted in a compacting/granulating machine type WP 50/75 (roll length 75 mm, roll diameter 152 mm) at a roll pressure of 16.0 kN/cmRL and a rotary speed of 8 rpm to give a slug 2.0 mm thick, and this slug is granulated to give small particulate granules (0.3–1.0 mm particle size). The output of onsize is about 23 kg/h, the proportion of undersize is about 26% of the total amount and is passed back for recompaction (separation by screening and sifting). 1.5% of a dustproofing oil (E31) is then sprayed onto the resulting onsize, and mixed. The resulting granular dye (dye compact) is notable for its outstandingly low dust content and its good dissolution properties. No changes occur in these properties even after prolonged storage, for example at room temperature for 6 months or at 40° C. for 5 weeks, and after transportation. Owing to its ideal free-flow properties the granular product can be metered readily using automatic units. It gives dyeings equivalent to those of the powder form.

In the following Examples 12 to 22 the compaction/granulation is carried out on a compacting/-granulating machine of the type WP 250/150 V with a roll length of 150 mm and a roll diameter of 250 mm. The slug thickness of the compacted dye is in each case 2.5 to 3.3 mm.

Example 12

A dye according to C.I. Reactive Blue 214 containing 20% sodium sulphate as extender, in powder form, which contains as an anionic surfactant 26% of the sodium salt of a naphthalene sulphonic acid/formaldehyde condensation product with a degree of sulphonation of 80–120%, is compacted under the following conditions: roll pressure= 21.7 kN/cm L, rotary speed=15 rpm, and granulated to a small-particle-size granulated product of 0.4–1.0 mm. The onsize yield is 200 kg/h. The granulated product is sprayed and mixed with 2.5% of dedusting oil (E31). The obtained compacted, granular blue reactive dye (dye compact) is notable for its good solubility and speed of dissolution, low dust content and stability to storage and transportation. Its bulk density is about twice the one of a corresponding powder, it is pourable and is suitable as hot dyeing dyestuff.

Example 13

A powdery reactive dye according to C.I. Reactive Blue 79 containing 20% of sodium sulphate as extender and which contains 34% of the sodium salt of a naphthalene sulphonic acid/formaldehyde condensation product with a degree of sulphonation of 80–120%, is compacted at a roll pressure of 20 kN/cmRL and rotary speed of 14 rpm and granulated to a small-size particle-size granular product of 0.4–1.0 mm. The onsize yield is 240 kg/h. The granulated product is sprayed and admixed with 2% of dedusting oil (E31). The obtained compacted, granular blue reactive dye his notable for its good solubility and speed of dissolution, low dust content and stability on storage and transportation. Its bulk density is about twice the one of a corresponding powder and it is pourable.

Example 14

A powdery dye according to C.I. Reactive Orange 13, which contains 20% of the sodium salt of a naphthalene sulphonic acid/formaldehyde condensation product with a degree of sulphonation of 80–120%, is compacted at a roll pressure of 13.3 kN/cmRL and rotary speed of 16 rpm and is granulated to a granular product of 0.4–1.0 mm. The onsize yield is about 200 kg/h. The granular product is sprayed and admixed with 2% dedusting oil (E31). The obtained compacted, granulated orange reactive dye (dye compact) is notable for its good solubility and speed of dissolution, for its low dust content and for its stability on storage and transportation. Its bulk density is about twice the one of a corresponding powder and it is pourable. In the production of printing pastes it distributes as well as the existing powder; due to its perfect pourability it can be metered excellently with automatic metering systems.

Example 15

A dye according to C.I. Reactive Orange 12 in powder form, which contains 20% of sodium sulphate as extender and 20% of the sodium salt of a naphthalene sulphonic acid/formaldehyde condensation product with a degree of sulphonation of 80–120%, is compacted at a roll pressure of 20 kN/cmRL and a rotary speed of 16 rpm and is granulated to a granular product of 0.4–1.0 mm. The onsize yield is 220 kg/h. The granular product is sprayed with 1.7% dedusting oil (E31) and mixed. The obtained compacted, granulated, orange reactive dye (dye compact) is notable for its good solubility and speed of dissolution, for its low dust content and for its stability on storage and transportation. Its bulk density is about twice the one of a corresponding powder and it is pourable.

Example 16

A dye according to C.I. Reactive Black 5 in powder form, which contains 20% of sodium sulphate as extender and 5–15% of the sodium salt of a naphthalene sulphonic acid/formaldehyde condensation product with a degree of sulphonation of 80–120%, is compacted at a roll pressure of 18.3 kN/cmRL and rotary speed of 15 rpm and granulated to a small particle size granular product of 0.4–1.0 mm. The onsize yield is 260 kg/h. The granular product is sprayed with 2% dedusting oil (E31) and mixed. The obtained compacted, granulated black reactive dye (dye compact) is notable for its good solubility and speed of dissolution, for its low dust content and its stability on storage and transportation. Its bulk density is about twice the one of a corresponding powder and it is pourable.

Example 17

A powdery dye according to C.I. Direct Red 83:1 which contains as additions only 11% $Na_2SO_4$ and 1.8% $Na_2CO_3$, is compacted at a roll pressure of 16.7 kN/cmRL and rotary speed of 16 rpm and then it is granulated to granules of 0.4–1.0 mm. The onsize yield is 220 kg/h. The granular product is sprayed with 2.5% dedusting oil (E31) and mixed. The obtained compacted, granulated red direct dye (dye compact) is notable for its good solubility and speed of dissolution, for its low dusting content and for its stability on storage and transportation. Its bulk density is about twice the one of a corresponding powder and it is pourable.

Example 18

A powdery dye according to C.I. Acid Yellow 59 which contains 1–5% hexylene glycol, is compacted at a roll pressure of 13.3 kN/cmRL and rotary speed of 20 rpm and then it is granulated to granules of 0.4–1.0 mm. The onsize yield is 200 kg/h. The granular product is sprayed with 2.5% dedusting oil (E31) and mixed. The obtained compacted, granulated yellow acid dye (dye compact) is notable for its good solubility and speed of dissolution, for its low dusting content and for its stability on storage and transportation. Its bulk density is about twice the one of a corresponding powder and it is pourable.

Example 19

A mixture of C.I. Acid Blue 230, C.I. Acid Blue 80 and C.I. Acid Green 25 in the weight ratio of 2:2:3 is commercially available as a blue acid dye. If this mixture is reproduced from dried synthetically produced dye presscakes, mixture containing 2,5% of polyvinylpyrrolidone K-30 and as surfactants 22% of lignine sulphonate and 16% of the sodium salt of a naphthalene sulphonic acid/formaldehyde condensation product, then it may be compacted under a roll pressure of 15 kN/cmRL and a rotary speed of 15 rpm and then be granulated to granules of 0.4–1.0 mm diameter. The onsize yield is 210 kg/h. The granulated product is sprayed with 2.5% dedusting oil (E31) and mixed. The obtained compacted, granulated acid dye mixture (dye compact) is notable for its good solubility and speed of dissolution, for its low dust content and for its stability on storage and transportation. It is suitable as a blue acid dye. Its bulk density is about twice the one of a corresponding powder and it is pourable.

Example 20

Analogously as in Example 19 a mixture of the dyes C.I. Acid Red 119, C.I. Acid Red 415 and C.I. Acid Red 260 in the ratio 1:7:6, which contains 5% polyvinyl pyrrolidone K-30 and 20% $Na_2SO_4$, is compacted at a roll pressure of 21.7 kN/cmRL and a rotary speed of 15 rpm and then granulated to granules of 0.4–1.0 mm diameter. The onsize yield is 250 kg/h. The obtained compacted, granulated red acid dye mixture (dye compact) is notable for its good solubility and speed of dissolution, for its low dust content and for its stability on storage and transportation. It is suitable as a red acid dye, its bulk density is about twice the one of a corresponding powder and it is pourable.

Example 21

A mixture of the dyes C.I. Reactive Red 239 and C.I. Reactive Red 147 in the ratio of 4: 1, which contains about 5 percent of the sodium salt of a naphthalene sulphonic acid/formaldehyde condensation product as surfactants and 20% Na2SO4 as extender, is compacted at a pressure of 16.7 kN/cmRL and a rotary speed of 18 rpm and then granulated to granules of 0.4–1.0 mm diameter. The onsize yield is 200 kg/h. The granulated product is sprayed with 1.8% dedusting oil (E31) and mixed. The obtained compacted, granulated red reactive dye mixture (dye compact) is notable for its good solubility and speed of dissolution, for its low dust content and for its stability on storage and transportation. It is suitable as a red reactive dye, its bulk density is about twice the one of a corresponding powder and it is pourable.

Example 22

The presscake obtained in the synthesis of C.I. Direct Blue 273 is mixed with maltodextrine and sodium sulphate and dried ($Na_2SO_4$ content=13%, maltodextrine content=13%). This dye is compacted at a roll pressure of 16.7 kN/cmRL and a rotary speed of 14 rpm and then it is granulated to granules of 0.4–1.0 mm diameter. The onsize yield is 230 kg/h. The granulated product is sprayed with 1.8% dedusting oil (E31) and mixed. The obtained compacted, granulated blue direct dye (dye compact) is notable for its good solubility and speed of dissolution, for its low dust content and for its stability on storage and transportation. It is suitable as a direct dye especially for the dyeing of paper, its bulk density is about twice the one of a corresponding powder and it is pourable.

The above dye compacts can be employed for dyeing in analogy to methods known for the respective dye powders, it also being possible to omit dye dissolution stages. Reactive-dye-containing printing pastes can be prepared, for example, in accordance with the following recipe:
Printing Formulation:
  600 g/kg alginate thickener
  100 g/kg urea
  10 g/kg sodium m-nitrobenzenesulphonate
  25 g/kg sodium bicarbonate
  235 g/kg water
  30 g/kg dye compact Operating Procedure for Preparing 500 kg of Ink Paste:

50 kg of urea, 5 kg of sodium m-nitrobenzenesulphonate, 12.5 kg of sodium bisulphite and 67.5 kg of water are added to 300 kg of preswollen alginate thickener. The mixture is then homogenized on a stirrer for 5 minutes, in the course of which the chemicals dissolve. As soon as this has taken place, the dye compact is added (scattered in) slowly with the stirrer running, and dissolves in the paste within 5 minutes. Finally, the remaining water (50 l) is added. After subsequent stirring for 10 minutes, the ink paste is ready for use (print-ready).

The possibility of scattering in the dye compacts without risk of dusting does away with the laborious hot predissolution of the dye, which before being added would have to be cooled back down to at least 60° C. With small batches in particular, moreover, reproducibility problems might arise owing to quantities of ink remaining in the dissolution vessel.

Application Example A

Satinet (bleached and caustified) is printed in a customary manner with a printing paste in accordance with the above instructions, and in which the dye compacts comprise C.I. Reactive Red 190, in accordance with Example 7, and is dried and fixed.

If desired, it is possible to carry out local overprinting with a printing paste in accordance with the above instructions and in which the dye compact contains C.I. Reactive Black 8, in accordance with Example 5.

Application Example B

Dyeing 500 kg of mercerized cotton yarn (cheeses) with C.I. Reactive Red 243 on a Krantz apparatus.

After the machine has been loaded with the material carrier and closed, water and 0.5 g/l deaerating/wetting agent are introduced, and the circulation pump is started. The bath is heated to 50° C. In the preparation vessel, 200 l of water are heated to 90° C. and 10 kg of dye compact in accordance with Example 10 is scattered in slowly with stirring. After 5 minutes of stirring, the stirrer is shut off and the dye solution is added over the course of 10 minutes to the dye bath, which in the meantime is heated to 95° C. at a heating rate of 2° C. per minute. On reaching the dyeing temperature of 95° C., migration is allowed to take place for 30 minutes, and then the predissolved fixing alkali (sodium carbonate) is added (preferably by means of a metering pump) over the course of 30 minutes, dyeing is continued for 60 minutes, and then the dyeing is finished in a customary manner.

Here again, the laborious predissolution of the dye in separate containers can be omitted, the dissolution properties and the low dust content readily permitting dissolution in the machine.

Application Example C

Beam dyeing 200 kg of nylon/Lycra bathing tricot with C.I. Acid Green 40 dye compact according to Example 11.

The dyeing apparatus possesses a separate dissolution station from which the additives are called up automatically under computer control.

While the machine is being entered with the beam, laden with the nylon/Lycra bathing tricot, and is being filled with water and 0.5 g/l deaerating/wetting agent and started up (starting of the circulation pump), the dye and the dyeing chemicals are prepared in the dissolution station. 3 kg of dye are scattered with stirring into 100 l of boiling water. A separate vessel is used to prepare the levelling agent and the acid required to adjust the pH. After the beam (the goods) is prewetted/deaerated for 10 minutes, the dyeing program is switched on, and then the temperature and the additions of chemicals and dye take place automatically under program control. After the end of the program, the beam is withdrawn.

Although the majority of acid dyes require dissolution by boiling, here again the make-up form and the low dust content are the critical factors for simplicity of use in the dissolution station.

What is claimed is:

1. A compacted granular product (G) produced by the steps of:

providing a mixture of at least one water-soluble dye or optical brightener (A), with an extender (B), and optionally, at least one member selected from the group consisting of: at least one hydrophilic surfactant (C), further additives (D), to produce a mixture (M);

dry-compacting said mixture (M) to obtain a dry-compact (m);

granulating said dry-compact (m) to obtain a granulated dry-compact (gm); and treating said granulated dry-compact (gm) with a dust-binding oil (E) to produce a compacted granular product (G).

2. Compacted granular product (G) according to claim 1, further comprising at least one hydrophilic surfactant (C), and having a particle size in the range from 0.1 to 3 mm.

3. Compacted granular product (G) according to claim 1, characterized in that (E) is a hydrocarbon oil or a mixture of hydrocarbon oils, wherein the hydrocarbon oil or the mixture of hydrocarbon oils further comprises a hydrophilic surfactant (C).

4. A process for the dyeing or optical brightening of substrates comprising contacting said substrates with a dyeing or optical brightening composition containing compacted granular product (G) according to claim 1.

5. A process according to claim 4, characterized in that (G) is used to prepare concentrated stock solutions with which baths or printing pastes are prepared.

6. A process according to claim 5, characterized in that the baths or printing pastes are prepared directly by addition of (G).

7. The compacted granular product (G) according to claim 1, wherein the dry-compaction is conducted by means of roll presses at a roll pressure of >0.4 t/cmRL and the granulating is conducted to a size in the range of 0.1 to 3.0 mm.

8. The compacted granular product (G) according to claim 2, having a particle size in the range of 0.3–1 mm.

9. A process for the production of compacted granular product (G) comprising the steps of:

dry compacting uncompacted granules or powder consisting of:
   (A) at least one water-soluble dye or optical brightener,
   (B) an extender, and optionally, at least one member selected from the group consisting of
   (C) at least one hydrophilic surfactant, and
   (D) further additives, granulating, and mixing with a dust-binding oil (E).

10. Compacted granular product (G) obtained by the process according to claim 9.

11. The process according to claim 9, wherein the granulation is conducted to a size in the range of 0.1 to 3 mm.

* * * * *